United States Patent Office 2,763,326
Patented Sept. 18, 1956

2,763,326

METHOD AND COMPOSITION FOR ACIDIZING WELLS

Paul H. Cardwell and Alfred R. Hendrickson, Tulsa, Okla., assignors to The Dow Chemical Company, Midland, Mich., a corporation of Delaware No Drawing. Application February 18, 1952, Serial No. 272,270

3 Claims. (Cl. 166—42)

The invention relates to acidizing wells drilled into the earth. It more particularly concerns an improved hydrochloric acid composition for and method of acidizing wells penetrating earth formations.

In the usual well acidizing operation, as for the purpose of increasing the output of a well, the hydrochloric solution with or without fortification with a soluble fluoride is introduced into the well, and, when sufficient pressure is available or supplied, and the formation is sufficiently permeable, the acid also enters the adjacent earth formation. Acid-soluble matter of the earth contacted by the acid is attacked and dissolved away, thereby increasing the size of the well hole and enlarging the interstices of the adjacent formation through which the earth fluids reach the well. In some cases, sufficient pressure may be applied to the acid solution in the well hole to cause the acid to fracture and lift the overlying earth adjacent to the well, thereby forming passageways in the earth by hydraulic action and subjecting them to the solvent action of the acid. Essentially the same acidizing operations are performed in increasing the receptiveness of injection wells. The effectiveness of the conventional acidizing operation to increase the productiveness of a well (or to increase the receptivity of an injection well for fluid), we have found, appears to depend at least in part upon the nature of the solvent action of the acid. According to our investigations, including numerous tests on cores taken from calcareous formations, the conventional hydrochloric acid solution used in well acidization, when forced into and through a more or less fluid permeable core comprising acid-soluble matter, attacks the core mostly at the face exposed to the acid solution and rapidly dissolves it away. At the same time, some of the acid permeates the innumerable interconnected pores or interstitial spaces in the body of the core and becomes spent therein, thereby more or less increasing the flow capacity of the core. The resulting increased capacity for fluid flow, under a given pressure head, is not as great as it would be, if, instead of either enlarging each of the innumerable pores of the interstitial space or attacking the face of the formation, as in conventional acidizing, the acid were to expend itself in only a few of the existing pores so as to form a few large passageways from the well hole deeply into the earth formation. In addition, by forming fewer but larger passageways, and not expending itself either on the face of the formation or throughout the interstitial spaces therein, a smaller quantity of acid would suffice to form passages reaching farther into the formation before becoming spent. It is a desideratum of the art to overcome the shortcomings of conventional acidizing and to achieve greater effectiveness of the action of the acidizing solution.

It is, therefore, an object of the invention to provide an improved acid composition for and method of acidizing wells in which the tendency for the acid to become ineffectively expended in attacking the wall of the well hole as well as becoming ineffectively dissipated in multitudes of interconnected pores in the adjacent formation is overcome, if not substantially reduced. Other objects and advantages will become apparent as the description of the invention proceeds.

The invention involves the discovery that by including in the hydrochloric acid solution, which is injected into the earth formation adjacent to the well in the acidizing operation, between at least about 1 or preferably 2.2 and 10 per cent by weight of polyacrylic acid which at least temporarily thickens or increases the viscosity of the acid solution and deposits a water absorbent gel-like film or coating on the surface of the earth formation to be acidized, the hydrochloric acid solution no longer permeates the entire interstitial space in the earth formation into which the solution is injected, but instead becomes selective in its action in that it permeates the earth formation only in a comparatively few places per unit of area of the earth formation exposed to the acid solution in the well hole. The acid solution containing the polyacrylic acid, in accordance with the invention, has the peculiar property of entering and greatly enlarging only a few of the pores in the earth formation being acidized. The pores thus enlarged become passageways which have the appearance of "worm holes" and have a more or less uniform diameter along their length, the diameter of most of them being between about 0.05 and 0.3 inch. These worm holes extend from the face of the well hole through which the acid enters the formation and penetrate deeply into the formation, and the face of the formation through which the acid passes into the formation is but slightly eaten away. The passageways thus formed are usually branched. Sometimes one or more branches form from a single passageway entering the face of the formation and sometimes two or more passageways entering the face of the formation, will combine within the formation into a single passageway as the passageways lengthen. While the formation becomes thus acidized, the polyacrylic acid decomposes forming more or less of the calcium salt as the hydrochloric acid becomes spent in forming the passageways or worm holes. More or less of the calcium salt of the polyacrylic acid may remain as a deposit on the walls of the worm holes. Nevertheless, as a result of the acidizing, the fluid permeability of the formation is greatly increased. If desired, plain hydrochloric acid which is free from polyacrylic acid may be injected into the formation after or behind the polyacrylic acid containing hydrochloric acid to assist in decomposing in the formation the calcium polyacrylate which might tend to reduce the flow capacity of the worm holes.

Polyacrylic acid for use in the method may be prepared in any convenient manner if not available. One way to effect polymerization is to dissolve the monomer (acrylic acid, $CH_2=CHCOOH$) in water along with a suitable catalyst and heat the resulting solution. Polymerization is rapid at first being substantially nearly complete in a few minutes. Polymerization may continue to a limited extent thereafter for about 8 hours. In general, about a 2 to 25 per cent solution of the monomer in water polymerizes and temperatures of 50° to 200° F. are suitable for effecting polymerization. A preferred concentration for the monomer in the polymerization reaction is from 7.5 to 25 per cent. Suitable catalysts are combinations of both a reducing agent and an oxidizing agent used as a couple. For example, one mole of ammonium persulfate as an oxidizing agent may be used with 2 moles of sodium thiosulfate as a reducing agent. Another suitable couple is hydrogen peroxide and ferrous sulfate in equal molar amounts of each. The proportion of catalyst couple per 100 moles of monomer may vary over a range as for example in the case of the ammonium persulfate-sodium thiosulfate couple, 0.05 to 0.5 mole ammonium persulfate may be used together with twice the molar amount of sodium thiosulfate; in the case of the hydrogen peroxide-ferrous sulfate couple, 0.05 to 1 mole of hydrogen peroxide may be used together with an equal molar amount of ferrous sulfate.

The viscosity of the resulting polyacrylic acid solution depends upon the proportion of catalyst used so that solutions of polyacrylic acid of desired viscosity may be prepared by selecting a suitable proportion of catalyst within the aforesaid ranges. The following data set forth in Table I are illustrative of the viscosities obtainable with various amounts of catalysts based upon the number of moles of acrylic acid, the polymerization of the acrylic acid being effected in water in a concentration of 7.5 per cent.

Table I

| No. | Mole of Catalyst | | Viscosity of 7.5% polyacrylic acid in centipoises at 100° F. |
|---|---|---|---|
| | Ammonium persulfate | Sodium thiosulfate | |
| 1 | 0.075 | 0.15 | 32,000 |
| 2 | 0.11 | 0.22 | 27,000 |
| 3 | 0.22 | 0.44 | 24,000 |
| 4 | 0.33 | 0.66 | 3,500 |

In accordance with the invention, the hydrochloric acid with which the well is to be acidized is thickened to a viscosity of at least 50 centipoises by mixing with it a suitable amount of the polyacrylic acid at a temperature of at least 150° F. at which temperature the polyacrylic acid is soluble in the hydrochloric acid solution. A convenient way to accomplish the desired thickening is to mix equal volumes of the polyacrylic acid and the hydrochloric acid while maintaining these materials at a temperature of at least 150° F. The following data tabluated in Table II is illustrative of the effect on the viscosity of hydrochloric acid of mixing therewith equal volumes of polyacrylic acid solution of various viscosities and at various temperatures. In these data, the hydrochloric acid contained 20 per cent of HCl and the polyacrylic acid solution 7.5 per cent of polyacrylic acid.

Table II

| No. | Viscosity of polyacrylic acid solution in cps. at 100° F. | Viscosity in cps. of 10% hydrochloric acid resulting from mixing equal volumes of 7.5% polyacrylic acid and 20% hydrochloric acid | | |
|---|---|---|---|---|
| | | 150° F. | 175° F. | 200° F. |
| 1 | 32,000 | 1,900 | 1,700 | 1,500 |
| 2 | 27,000 | 1,400 | 1,200 | 1,000 |
| 3 | 24,000 | 1,100 | 900 | 700 |
| 4 | 3,500 | 700 | 450 | 300 |

In carrying out a well treatment according to the invention, the hydrochloric acid used may contain various concentrations of HCl such as 2 to 25 per cent of HCl by weight. In most instances, a concentration of 10 to 15 per cent of HCl by weight is generally suitable. The hydrochloric acid solution is heated preferably at least to 150° F. and more or less thickened by mixing therewith as aforesaid, before its introduction into the earth formation, a sufficient amount of an aqueous solution of suitably polymerized acrylic acid. For forming passageways or worm holes, without resorting to the use of treating pressures as high as those required for lifting the overburden of earth, suitable concentrations of the polyacrylic acid are between 1 per cent and 5 per cent or preferably about 2 to 3 per cent by weight of the hydrochloric acid solution. In using well treating pressures sufficiently great to lift the overburden of earth, the polyacrylic acid concentration is preferably increased to as much as between 5 to 10 per cent by weight, giving viscosities as high as 100,000 centipoises.

Inasmuch as the minimum temperature at which effective results are obtained is about 150° F., the viscosity of the hydrochloric acid solution which is effective with the minimum concentration (1 per cent) of polyacrylic acid is about 50 centipoises. At higher temperatures somewhat more polyacrylic acid is required to raise the viscosity of the hydrochloric acid-polyacrylic acid mixture above 50 centipoises.

As the HCl in the hydrochloric acid solution containing the polyacrylic acid becomes spent in the earth formation, the solution becomes less viscous. For example, 150 ml. of hydrochloric acid solution containing 10 per cent of HCl and 5 per cent of polyacrylic acid has a viscosity of 150 cps. at 150° F. Upon the addition of calcium carbonate which neutralizes an equivalent amount of HCl, the viscosity declines, the extent of the decline in viscosity being dependent upon the proportion of HCl neutralized as indicated in the following data (Table III).

Table III

| Grams CaCO₃ added | Viscosity at 150° F. of HCl-polyacrylic acid solution, cps. |
|---|---|
| none | 150 |
| 8 | 120 |
| 9.5 | 50 |
| 11 | 20 |
| 21 [1] | <20 |

[1] All HCl neutralized.

The following example is illustrative of a well treatment in accordance with the invention.

A calcareous oil-bearing formation 6500 feet below the ground surface is penetrated by the bore of a well provided with the usual casing and tubing. The temperature of the well at the producing formation is 200° F. Worm hole-like passages are to be formed in the producing formation by the injection thereinto through the tubing of an acidizing composition comprising 1000 gallons of hydrochloric acid solution containing 10 per cent of HCl and thickened with polyacrylic acid to a viscosity of 300 cps. The acidizing solution is prepared as follows: In a tank 40 gallons of glacial acrylic acid is diluted with enough water to make a volume of 490 gallons. This requires about 450 gallons of water. To this solution is added with thorough mixing 4 gallons of 1.0 molar aqueous sodium thiosulfate solution and 4 gallons of 0.5 molar aqueous ammonium persulfate solution. The solution is maintained at 100° F. for 8 hours, thereby forming polyacrylic acid solution and increasing the viscosity of the solution to 3700 cps. From a second tank 500 gallons of hydrochloric acid containing 20 per cent of HCl and a corrosion inhibitor is then added to the so prepared polyacrylic acid solution. The resulting mixture is vigorously agitated for a few minutes so as to completely disperse the polyacrylic acid in the hydrochloric acid solution. The resulting 1000 gallons of hydrochloric acid solution contains 10 per cent of HCl and has a viscosity of 300 cps. at 200° F. After injecting the solution into the formation through the well tubing, the well is shut in for 30 minutes and then put on production.

If desired a corrosion inhibitor may be included in the acid solution to protect the metal parts of the well from attack by the acid. In addition, there may be included an emulsion breaking agent to prevent the possibility of the acid solution forming undesirable emulsions with oil in oil producing formations.

We claim:

1. In a method of acidizing a well in a calcareous formation having a temperature of at least 150° F. the step which consists in injecting into the earth formation through the well an aqueous hydrochloric acid solution having dispersed therein at least 1.0 per cent by weight of polyacrylic acid, said solution containing from 2 to 25 per cent of HCl by weight and having a viscosity of at least 50 centipoises at 150° F.

2. A composition for acidizing wells in a calcareous formation comprising an aqueous solution having dissolved therein from 2 to 25 per cent of HCl, and from 1.0 to 10 percent by weight of polyacrylic acid having a viscosity of 3500 to 32,000 centipoises in 7.5 per cent aqueous solution at 100° F.

3. In a method of acidizing a well in a calcareous earth formation having a temperature of at least 150° F. the steps which consist in injecting into the earth formation through the well an aqueous hydrochloric acid solution having dispersed therein between 5 and 10 per cent by weight of polyacrylic acid, said solution containing from 2 to 25 per cent by weight of hydrochloric acid.

References Cited in the file of this patent

UNITED STATES PATENTS

| | | |
|---|---|---|
| 1,976,679 | Fikentscher et al. | Oct. 9, 1934 |
| 2,317,328 | Kinney | Apr. 20, 1943 |
| 2,596,137 | Fast | May 13, 1952 |